United States Patent Office

3,639,544
Patented Feb. 1, 1972

3,639,544
PROCESS FOR MANUFACTURING HIGH MOLECULAR WEIGHT TRIARYL PHOSPHATES AND REACTION PRODUCTS THEREOF
Albert L. Smith, Middleport, Ohio, assignor to Stauffer Chemical Company, New York, N.Y.
No Drawing. Filed Nov. 22, 1967, Ser. No. 684,969
Int. Cl. C07f 9/12, 9/08
U.S. Cl. 260—966         4 Claims

ABSTRACT OF THE DISCLOSURE

A composition of matter and its phosphate derivatives consisting essentially of a high boiling point aromatic material containing from 9 to 18 carbon atoms and 3,4 xylenol and from 10 to 50% by weight of a lower boiling point aromatic material consisting essentially of 2,6 xylenol and a process of manufacturing the same.

BACKGROUND OF THE INVENTION

In the art of manufacturing phenol, cresol and xylenol, it is the practice to introduce a mixture of cresylic acids, usually derived from coal or hydrocarbon tars, into a distillation tower. The first fraction to be removed is predominantly phenol because of its lower boiling point, along with a small portion of cresol and xylenol isomers. Then, cresol and certain xylenol isomers are fractioned off. The remaining material is a high boiling point mixture of aromatic hydrocarbons that are essentially useless. Analysis of these remaining aromatic materials indicate that they contain from about 25 to 40% by weight 3,4 xylenol isomer and the remainder being aromatics containing at least 9 or more carbon atoms.

The recovered phenol, cresol and xylenol can be reacted with phosphorus oxychloride to form the respective triaryl phosphates which find use as hydraulic or other functional fluids and plasticizers. However, attempts to react phosphorus oxychloride with the high boiling point aromatic materials containing 9 or more carbon atoms and the 3,4 xylenol isomer results in a highly viscous, high boiling point material that cannot be recovered by ordinary distilling or fractionating means because ordinary distilling and fractionating towers cannot be operated efficiently above a temperature of 320° C., which prevents recovery of commercial yields. Thus, in order to recover any portion of the high molecular weight, high boiling point triaryl phosphates, special equipment must be designed to operate under high vacuum at high temperature conditions.

Moreover, it has been long known in the art that cresylic acids containing increasing amounts of the 2,6 xylenol isomer in combination with the normal found isomers, i.e., phenol; meta-cresol; para-cresol; ortho-cresol; 2,3 xylenol; 3,4 xylenol; 3,5 xylenol; 2,4 xylenol; 2,5 xylenol and meta-ethyl phenols and para-ethyl phenols will give esters of varying viscosity and that in the presence of substantial amounts of these isomers the 2,6 xylenol isomer is the slowest reacting of the isomers with phosphorus oxychloride. Thus, when 2,6 xylenol is mixed with either synthetic or high purity naturally occurring phenol and reacted with hosphorus oxychloride, there is a selective reaction of the phenol and phosphorus oxychloride rather than a ratio reaction of the 2,6 xylenol isomer and the phenol with the phosphorus oxychloride. In order to reach the desired reaction completion of the mixture, it is necessary to react to temperatures not obtainable in ordinary type reactors. Even upon attaining these higher temperatures, reaction cycles are unnecessarily long, with the net result that the manufacturing of the triaryl phosphates by reacting phosphorus oxychloride with mixtures of phenol and 2,6 xylenol is unattractive.

BRIEF DESCRIPTION OF THE INVENTION

It has been discovered that the order of decreasing reactivity between the cresylic acid isomers and phosphorous oxychloride generally follows the pattern of increasing boiling point of the cresylic isomers, i.e., the higher the boiling point the lower the order of reactivity, that 2,6 xylenol functions the same way as phenol when admixed with feed streams containing high percentages of the more difficult reactable 3,4 xylenol and the high boiling point aromatic materials containing 9 or more carbon atoms. Thus, in the absence of appreciable amounts, at least 5% or below, of phenol; meta, para, and ortho-cresol; 2,3 xylenol; 3,5 xylenol; 2,4 xylenol; 2,5 xylenol; but in the presence of 3,4 xylenol and the high boiling point aromatic materials containing 9 or more carbon atoms there would be provided sufficient phosphorus and chlorine sites available for reaction with the 2,6 xylenol. This combination of materials materially reduces the vapor pressure of the rtiaryl phosphates species formed so that the pressures and temperatures necessary for distillation in commercial equipment is attained.

DETAILED DESCRIPTION OF THE INVENTION

In the practice of the present invention, cresylic acids derived from hydrocarbon or coal tars are injected into a distillation tower in a conventional manner. The temperature of the distillation tower will range between 180 and 235° C. Thus, the first fraction that is recovered from the distillation tower will be phenol because of its boiling point of about 182° C. The next fraction that is recovered will be a mixture of cresols and xylenols. The mixture of cresols and xylenols can be separated in a conventional manner by distillation. The remaining material that is within the distillation tower is a heavy fraction of 3,4 xylenol and aromatic materials that have at least 9 carbon atoms and usually below 18 carbon atoms.

In accordance with the present invention, 2,6 xylenol is admixed with the heavy fraction in amounts ranging between 10% and 50% by weight, but preferably between 10% and 40% by weight. This mixture of high boiling point aromatic material consisting of 3,4 xylenol and aromatics containing 9 carbon atoms or more and the 2,6 xylenol isomer will effectively reduce the vapor pressure and boiling point of the resultant mixture and the same is distilled in a conventional manner. The fraction that is recovered, according to this process, will contain the 2,6 xylenol isomer admixed with the heavy fraction of aromatic materials consisting of 3,4 xylenol and aromatics having 9 carbon atoms or more. The degree of purity of the xylenol isomer used is not critical. However, the 2,6 xylenol isomer may contain traces of cresol and other xylenol isomers but should not exceed 5% by weight. This material is then reacted with phosphorus oxychloride to form a mixture of the respective triaryl phosphates. The reacting conditions of the mixture of materials with phosphorus oxychloride is carried out in a conventional manner.

This mixture of triaryl phosphates has a stable viscosity range of between 400 and 750 Sabolt Universal seconds measured at 100° F. and has wide use as hydraulic fluids because of its relatively stable viscosity under a wide variety of environments.

The following examples illustrate the invention.

EXAMPLE 1

A charge of 300 grams of aromatic material consisting essentially of 30% 3,4 xylenol and 70% aromatic material containing more than 9 carbon atoms was reacted with 95% of the stoichiometric amount of phosphorus oxychloride in the presence of a conventional catalyst. The reaction product was then subjected to a distilling operation which included a standard 1 liter flask connected to a Claissen head which led to a condenser which was connected to a receiver to collect the materials. The flask was heated and connected to an evacuation system and operated under 20 to 21 millimeters of mercury vacuum. The recovery of the triaryl phosphate material is tabulated below:

TABLE 1

| Ml. | Temperature, °C. | Pressure, mm. Hg |
|---|---|---|
| 0 | 310 | 20 |
| 25 | 315 | 20 |
| 50 | 320 | 20 |
| 75 | 321 | 20 |
| 100 | 324 | 20 |
| 125 | 324 | 20 |
| 150 | 328 | 20 |
| 175 | 335 | 21 |
| 200 | 335 | 21 |

EXAMPLE 2

The procedure as outlined in Example 1 was repeated in its entirety except that the charge was 25% 2,6 xylenol and 75% aromatic material consisting essentially of 30% by weight 3,4 xylenol and 70% aromatic material with nine carbon atoms or more, and the pressure was 25 millimeters of vacuum. The results of distillation of this material are tabulated below:

TABLE 2

| Ml. | Temperature, °C. | Pressure, mm. Hg |
|---|---|---|
| 0 | 295 | 25 |
| 53 | 299 | 25 |
| 110 | 305 | 25 |
| 150 | 303 | 25 |
| 165 | 304 | 25 |
| 182 | 305 | 25 |

The viscosity of the end products after distillation was 501 Saybolt Universal seconds measured at 100° F.

EXAMPLE 3

The procedure as outlined in Example 2 was repeated in its entirety except 40% 2,6 xylenol was employed with 60% aromatic material consisting of 30% 3,4 xylenol and 70% aromatic material of 9 carbon atoms or more. Distillation of the product was carried out at 15 millimeters mercury vacuum. The results of distillation of this material are tabulated below:

TABLE 3

| Ml. | Temperature, °C. | Pressure, mm. Hg |
|---|---|---|
| 0 | 270 | 15 |
| 10 | 273 | 15 |
| 50 | 275 | 15 |
| 100 | 279 | 15 |
| 150 | 281 | 15 |
| 190 | 283 | 15 |
| 200 | 282 | 15 |

The viscosity of this material measured at 100° F., was 686 Saybolt Universal seconds.

By comparing the results as indicated in Tables 1, 2 and 3, it is clear that the temperatures involved for the recovery of triaryl phosphates formed by reacting phosphorus oxychloride with a mixture of aromatic materials consisting of essentially 2,6 xylenol combined with an aromatic material containing 9 carbon atoms or more and 3,4 xylenol, is much lower and well within the range of optimum operating conditions for plant operations while the recovery of the aromatic materials without the 2,6 xylenol isomer admixed therein is well above the normal temperatures encountered in distillation processes.

What is claimed is:

1. A process for manufacturing triaryl phosphates having viscosities in the range from 400 to 700 Saybolt Universal seconds at 100° F. comprising:
    (a) admixing from 10 to 50 percent by weight of 2,6-xylenol with from 90 to 50 percent by weight of a mixture consisting essentially of 25 to 40 percent 3,4-xylenol and 75 to 60 percent aromatic materials having from 9 to 18 carbon atoms, said mixture being obtained by distilling off phenol, cresols, and low boiling xylenols from crude cresylic acid, and
    (b) reacting the mixture obtained from step (a) with phosphorus oxychloride to obtain the triaryl phosphate.

2. The process of claim 1 wherein the 2,6-xylenol is present in an amount from 10 to 40 percent by weight of the entire reactant mixture.

3. In the process of manufacturing triaryl phosphates by reacting phosphorus oxychloride with a mixture consisting essentially of from 25 to 40 percent 3,4-xylenol and 75 to 60 percent of aromatic materials having from 9 to 18 carbon atoms, said mixture being obtained by distilling off phenol, cresols and low boiling xylenols from crude cresylic acid, the improvement which comprises admixing with said mixture, prior to reacting it with phosphorus oxychloride from 10 to 40 percent by weight of the total reactant mixture of 2,6-xylenol.

4. The product of the process of claim 1.

References Cited

UNITED STATES PATENTS

| 1,425,393 | 8/1922 | Laska et al. | 260—966 |
| 2,870,192 | 1/1959 | Bonstedt | 260—975 |
| 2,995,519 | 8/1961 | Shatynski et al. | 260—966 X |
| 3,022,331 | 2/1962 | Bondy et al. | 260—966 |
| 3,077,491 | 2/1963 | Seglin et al. | 260—975 |

CHARLES B. PARKER, Primary Examiner

R. L. RAYMOND, Assistant Examiner

U.S. Cl. X.R.

252—46.6; 260—621 R, 975